United States Patent [19]

Ochiai

[11] Patent Number: 5,038,340
[45] Date of Patent: Aug. 6, 1991

[54] EXCHANGE ROUTE DECISION SYSTEM AND METHOD
[75] Inventor: Tamiya Ochiai, Hachioji, Japan
[73] Assignee: Kabushiki Kaisha Toshiba, Kawasaki, Japan
[21] Appl. No.: 426,380
[22] Filed: Oct. 25, 1989
[30] Foreign Application Priority Data
Oct. 27, 1988 [JP] Japan .............................. 63-271603
[51] Int. Cl.$^5$ .............................................. H04J 3/22
[52] U.S. Cl. ......................................... 370/17; 370/54
[58] Field of Search ....................... 370/13, 14, 16, 17, 370/58.1, 58.2, 58.3, 60, 54; 379/220

[56] References Cited
U.S. PATENT DOCUMENTS
4,884,263 11/1989 Suzuki .................................... 370/60
4,984,264 1/1991 Katsube ................................. 370/54

Primary Examiner—Douglas W. Olms
Assistant Examiner—Melvin Marcelo
Attorney, Agent, or Firm—Finnegan, Henderson, Farabow, Garrett, and Dunner

[57] ABSTRACT

An exchange route decision system and method which, when it is desired to realize tandem connection between outgoing and incoming communication terminals of various sorts and multiple rates requiring immediate data communication through a plurality of exchanges, take the residual capacities of relay lines between the outgoing and incoming terminals into consideration. In the system and method, the residual capacities of the relay lines between the outgoing and incoming terminals are divided into a plurality of classes based on predetermined line capacity units, data on routes providing minimum costs in association with the clases are controlled, and one of routes corresponding to the class satisfying the request line capacity of the outgoing terminal is selected to thereby realize the dandem connection between the outgoing and incoming terminals.

16 Claims, 9 Drawing Sheets

| INCOMING EXCHANGE | RESIDUAL CAPACITY CLASS NUMBER | MINIMUM COST | MINIMUM COST LINE NUMBER |
|---|---|---|---|
| | | | ←TBMCC |
| $N_j$ | 1 | $C_{Nj,C1}$ | $L_{X1}$ |
| | 2 | $C_{Nj,C2}$ | $L_{X2}$ |
| | 3 | $C_{Nj,C3}$ | $L_{X3}$ |
| | 4 | $C_{Nj,C4}$ | $L_{X4}$ |
| | 5 | $C_{Nj,C5}$ | $L_{X5}$ |
| ⋮ | ⋮ | ⋮ | ⋮ |

FIG. 6

| CLASS NUMBER | RESIDUAL LINE CAPACITY RANGE | MEANING |
|---|---|---|
| 1 | $B_1 \leq Q < B_2$ | FOR TERMINAL REQUEST LESS THAN $B_1$ |
| 2 | $B_2 \leq Q < B_3$ | FOR TERMINAL REQUEST LESS THAN $B_2$ |
| 3 | $B_3 \leq Q < B_4$ | FOR TERMINAL REQUEST LESS THAN $B_3$ |
| 4 | $B_4 \leq Q < B_5$ | FOR TERMINAL REQUEST LESS THAN $B_4$ |
| 5 | $B_5 \leq Q < B_6$ | FOR TERMINAL REQUEST LESS THAN $B_5$ |
| ⋮ | ⋮ | ⋮ |

FIG. 7

| RESIDUAL CAPACITY CLASS | RESIDUAL CAPACITY RANGE |
|---|---|
| 1 | $1 \leq Q < 2$ |
| 2 | $2 \leq Q < 4$ |
| 3 | $4 \leq Q < 8$ |
| 4 | $8 \leq Q < 10$ |
| 5 | $10 \leq Q$ |

| INCOMING EXCHANGE | RESIDUAL LINE CAPACITY CLASS NUMBER | MINIMUM COST VALUE |
|---|---|---|
| Nj | 1 | $C_{Nj,Li,C1}$ |
|  | 2 | $C_{Nj,Li,C2}$ |
|  | 3 | $C_{Nj,Li,C3}$ |
|  | 4 | $C_{Nj,Li,C4}$ |
|  | 5 | $C_{Nj,Li,C5}$ |
|  | ⋮ | ⋮ |
| ⋮ | ⋮ | ⋮ |

FIG. 11

TBMCL

| INCOMING EXCHANGE | RESIDUAL CAPACITY CLASS NUMBER | LINE L1 | ---- | LINE Li | ---- | LINE LL |
|---|---|---|---|---|---|---|
| Nj | 1 | $C_{Nj,L1,C1}$ |  | $C_{Nj,Li,C1}$ |  | $C_{Nj,LL,C1}$ |
|  | 2 | $C_{Nj,L1,C2}$ |  | $C_{Nj,Li,C2}$ |  | $C_{Nj,LL,C2}$ |
|  | 3 | $C_{Nj,L1,C3}$ |  | $C_{Nj,Li,C3}$ |  | $C_{Nj,LL,C3}$ |
|  | 4 | $C_{Nj,L1,C4}$ |  | $C_{Nj,Li,C4}$ |  | $C_{Nj,LL,C4}$ |
|  | 5 | $C_{Nj,L1,C5}$ |  | $C_{Nj,Li,C5}$ |  | $C_{Nj,LL,C5}$ |
|  | ⋮ |  |  |  |  |  |
| ⋮ |  |  |  |  |  |  |

FIG. 12

| INCOMING EXCHANGE | RESIDUAL CAPACITY CLASS NUMBER | MINIMUM COST VALUE |
|---|---|---|
| ⋮ | | |
| $N_j$ | 1 | $C_{N_j, C_1}$ + LINE $L_K$ LOAD VALUE |
| | 2 | $C_{N_j, C_2}$ + LINE $L_K$ LOAD VALUE |
| | 3 | $C_{N_j, C_3}$ + LINE $L_K$ LOAD VALUE |
| | 4 | $C_{N_j, C_4}$ + LINE $L_K$ LOAD VALUE |
| | 5 | $C_{N_j, C_5}$ + LINE $L_K$ LOAD VALUE |
| | ⋮ | |
| ⋮ | | |

TBMCL$_K$

FIG.13

EXCHANGE ROUTE DECISION SYSTEM AND METHOD

BACKGROUND OF THE INVENTION

1. Field of the Invention

The present invention relates generally to exchange route decision systems and methods of communication networks wherein tandem connection is carried out between various sorts of and multiple speed communication terminals through a plurality of exchanges to realize immediate information communication between the terminals and, more particularly, to an exchange route decision system and method which take residual line capacity into consideration.

2. Description of the Prior Art

Figure 1:
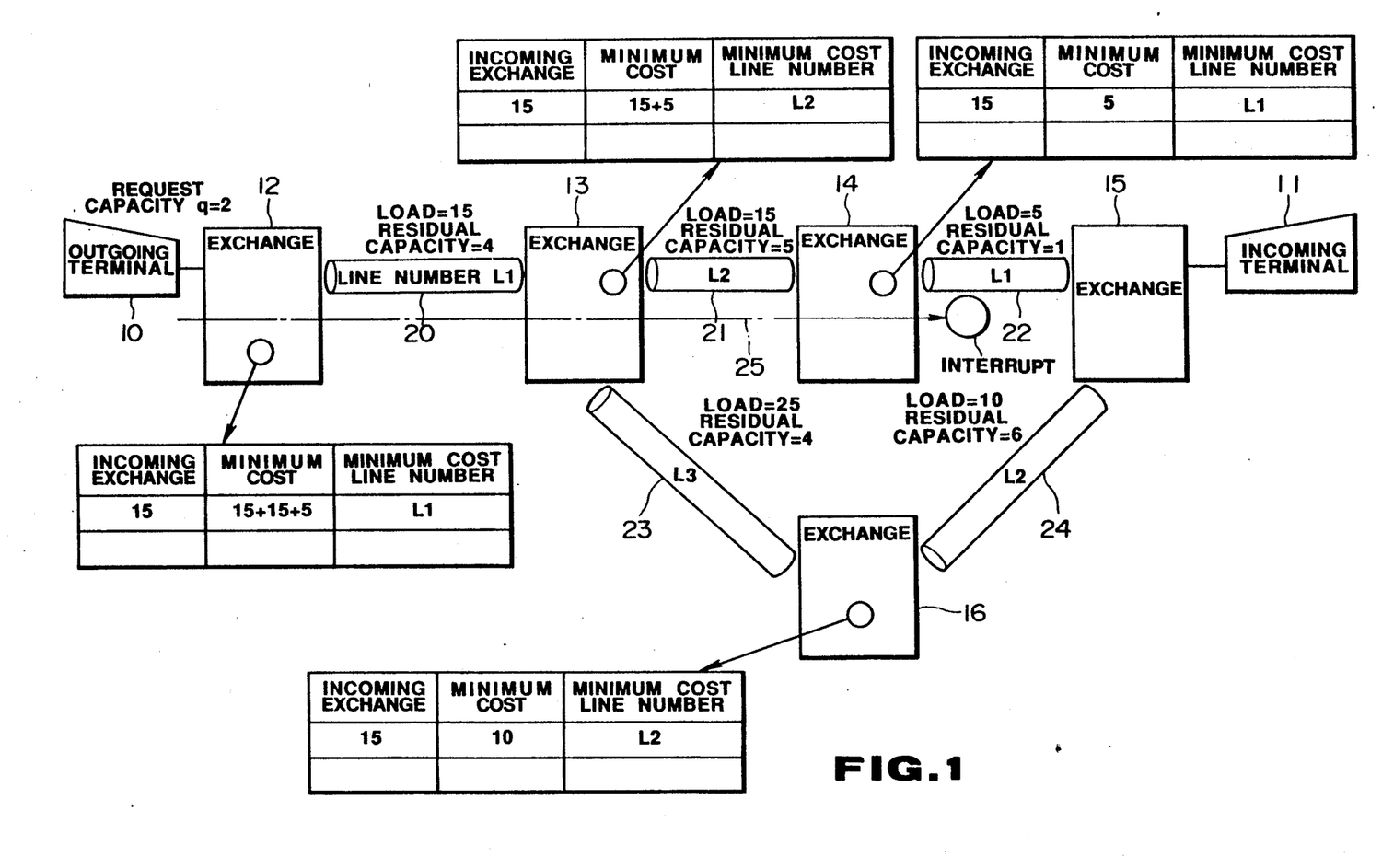
FIG. 1 shows an example of an exchange system for explaining a prior art route decision method.

FIG. 1 shows an example of a prior art exchange route decision method in the case where tandem connection is carried out between communication terminals through a plurality of exchanges. In the drawing, tandem connection between an outgoing terminal 10 and an incoming terminal 11 is realized by selecting either one of two routes, i.e., exchange 12→line 20→exchange 13→line 21→exchange 14→line 22→exchange 15→incoming terminal 11; exchange 12→line 20→exchange 13→line 23→exchange 16→line 24→exchange 15→incoming terminal 11.

The exchanges 12 to 16, which form a relay route for transmission of communication data, include connection type packet exchanges, connection type line exchanges, connection type asynchronous transfer mode exchanges and the like exchanges.

Prior to establishing the tandem connection between the outgoing and incoming terminals 10 and 11, the exchanges 12 to 16 determines one of the routes which is minimum in the cost $C_j$ of the routes in such a manner as to be mentioned in the following. Here, the cost $C_j$ is expressed in terms of an estimated value of the route from the outgoing exchange 12 to the incoming exchange 15, and defined, for example, as the following equation.

$$C_j = \sum_{Li} (\alpha + \beta D_{Li}) \quad (1)$$

where Li represents the number of a line making up a route between the exchanges, $D_{Li}$ represents a distance between the exchanges, $\alpha$ represents the processing load cost of a relay exchange, and $\beta$ represents a cost coefficient relating to line distance. The value $(\alpha + \beta D_{Li})$ indicates the load of the line and when the line is abnormal, the value is expressed in terms of $\infty$.

Figure 2:
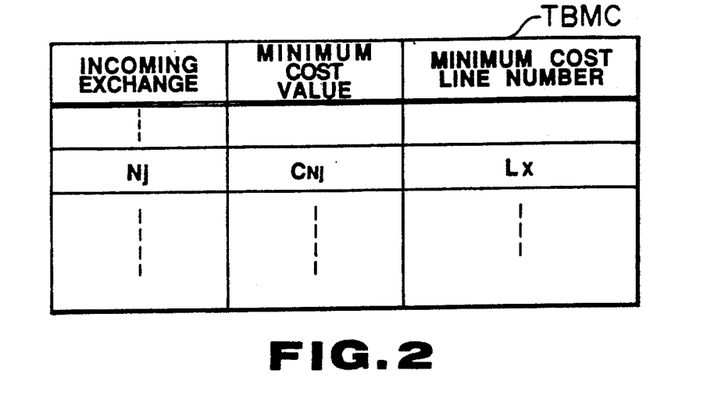
FIG. 2 shows the structure and contents of a minimum cost table used in the prior art route decision method.

Each of the exchanges 12, 13, 14 and 16 calculates the costs $C_j$ of a plurality of routes from each of the exchanges to the incoming terminal 11. A minimum $C_{Nj}$ of the costs $C_j$ thus calculated as well as information on the number $L_x$ of starting one of the lines contributing to the minimum cost $C_{Nj}$ are held in a minimum cost table TBMC with respect to the different exchanges, as shown in FIG. 2. For example, assume that, in the example of FIG. 1, the lines 20, 21, 22, 23 and 24 have loads of 15, 15, 5, 25 and 10, respectively. Then the contents of the minimum cost tables TBMC for the respective exchanges 12 to 14 and 16 are as shown in FIG. 1. More specifically, when attention is directed to the exchange 13 which corresponds to a branch point of the two routes from the outgoing terminal 10 to the incoming terminal 11, the exchange 13 selects the line 21 having the line number Lx of L2 as a minimum cost line.

In the example of FIG. 1, accordingly, the route of the exchange 12→the exchange 13→the exchange 14→the exchange 15 is selected for the tandem connection between the outgoing and incoming terminals 10 and 11.

Figure 3:
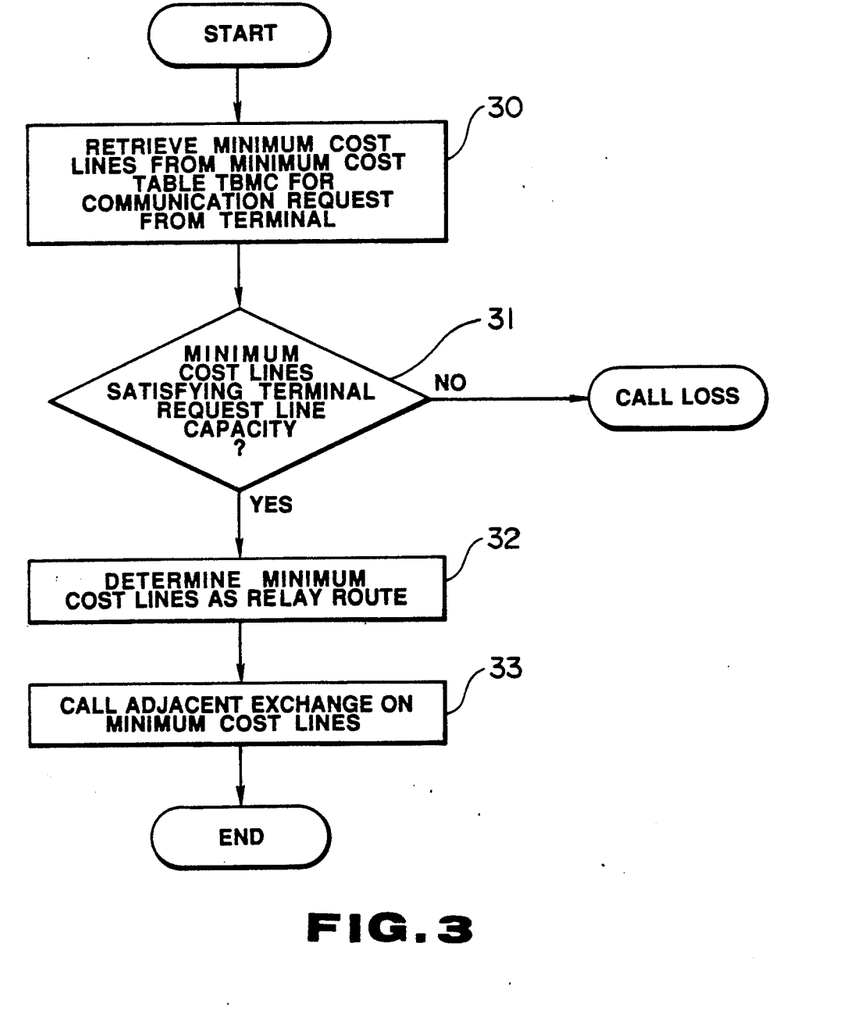
FIG. 3 is a flowchart showing a prior art route decision procedure.

Such a route deciding procedure is shown in FIG. 3 in the form of a flowchart. More in detail, when the outgoing terminal issues a calling request, the present system retrieves the minimum cost line number Lx relating to the incoming exchange from the minimum cost table TBMC (step 30). Thereafter, the system examines whether or not the line capacity requested by the outgoing terminal remains in the line corresponding to the retrieved line number $L_x$ (step 31). If not, then the system processes it as a call loss.

When the line capacity remains in the line corresponding to the retrieved line number Lx, the system determines that the line of the retrieved line number $L_x$ is the minimum cost line (step 32) and calls the adjacent exchange which is connected to the downstream end of the $L_x$ line in question (step 33).

Here, assuming in the above route deciding procedure that the outgoing terminal 10 requests a line capacity q of 2 and the lines 20 to 24 have residual capacities Q (which can be used by the lines 20 to 24) of 4, 5, 1, 4 and 6, respectively, then the route extended from the exchange 12 to the exchange 14 can be used for tandem connection since the request capacity q of the outgoing terminal 10 is larger than any of the residual capacities Q of the lines 20 and 21. With respect to the route from the exchange 14 to the exchange 15, however, the residual capacity Q of the line 22 is smaller than the request capacity q and thus tandem connection is broken at the stage when the system calls the exchange 14, as shown by an arrow 25 in FIG. 1, whereby the system processes it as a call loss.

In this way, the prior art route decision method has had such a problem that, since the prior art selects one of the routes from the outgoing terminal to the incoming terminal on the basis of only the minimum cost information, there is a possibility that the prior art may select such a route as not satisfying the request line capacity of the outgoing terminal, thus involving a call loss.

SUMMARY OF THE INVENTION

It is an object of the present invention to provide an exchange route decision system and method which can select one of routes which is minimum in cost without causing any call loss, whereby tandem connection can be realized between outgoing and incoming terminals.

In accordance with the present invention, the residual capacities of relay lines are divided into a plurality of classes based on predetermined capacity units, data on routes providing minimum costs are managed or controlled according to the classes, one of the routes corresponding to the class satisfying a request line capacity issued from an outgoing terminal is selected to realize tandem connection between outgoing and incoming terminals.

Each of the exchanges divides the residual capacities of lines into the plurality of classes based on, for example, several capacity units and controls data on the routes providing the minimum costs according to the different classes. If the exchange receives a new line connection request, then it selects one of the routes corresponding to the class satisfying the request line capacity demanded by the line connection request.

Therefore, if one of the routes connecting the outgoing and incoming terminals satisfies the request line capacity of the outgoing terminal, then tandem connection can be attained between the outgoing and incoming terminals through this route. Thus, the system can avoid the generation of any call loss except in the case where no route satisfying the request line capacity of the outgoing terminal is available.

In this way, in accordance with the present invention, the routes providing the minimum costs are classified according to the residual line capacity and one of the routes corresponding to the class satisfying the request line capacity of the outgoing terminal is sequentially selected. As a result, the system of the invention will not generate any call loss except for the highly limited conditions and can reliably connect the outgoing and incoming terminals through the minimum cost route. The present invention therefore offers remarkable improvement in determining a route through a network, wherein the network includes exchanges connected to terminals having various transmission rates which process real-time voice data.

DESCRIPTION OF THE PREFERRED EMBODIMENT

Figure 4:
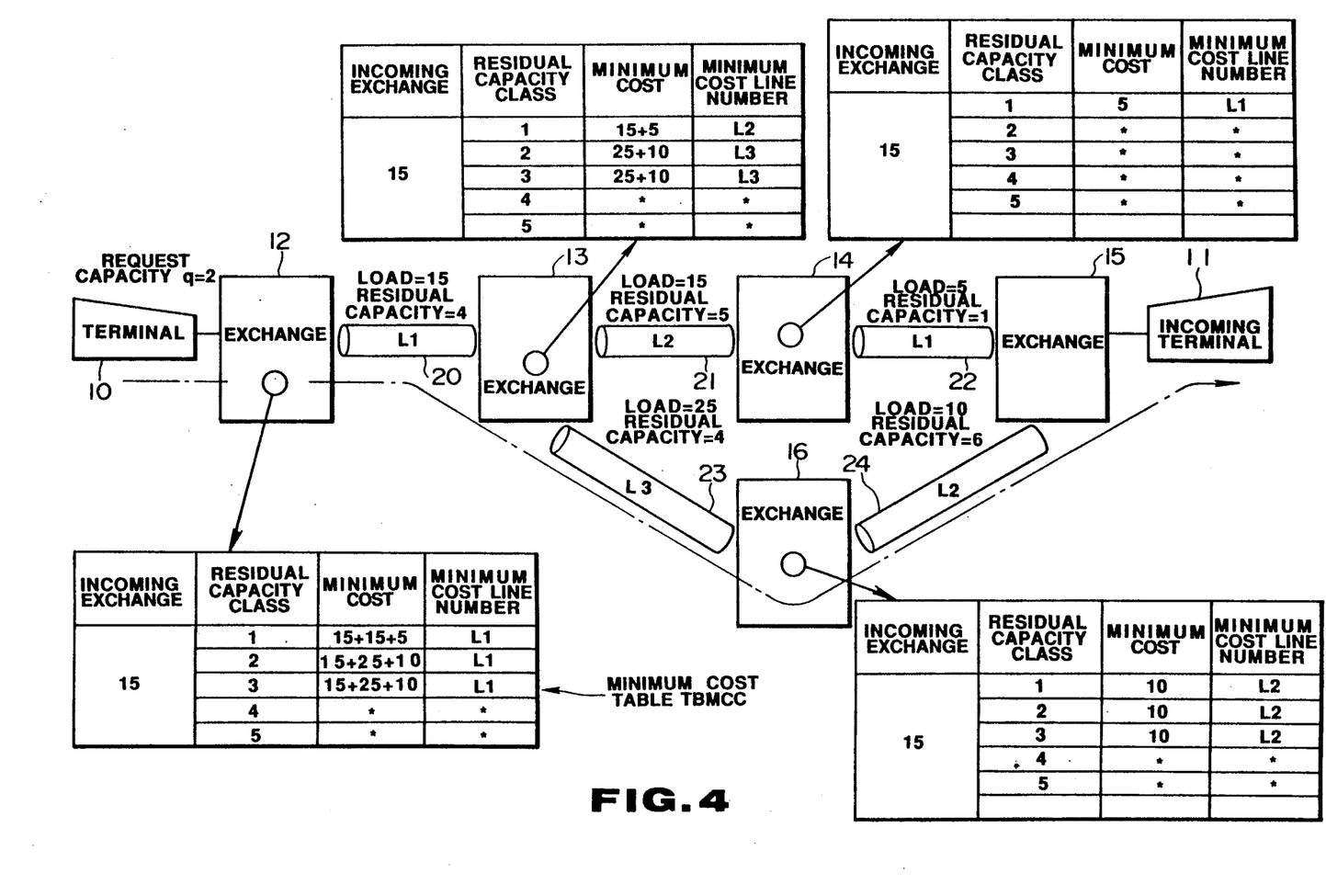
FIG. 4 shows an embodiment of an exchange system for explaining a route decision method in accordance with the present invention.

Referring to FIG. 4, there is shown an embodiment of a route decision method in accordance with the present invention, in which, as in the case of FIG. 1, tandem connection is realized between outgoing and incoming terminals 10 and 11 by selecting either one of two routes, that is, exchange 12→line 20→exchange 13→line 21→exchange 14→line 22→exchange 15→incoming terminal 11; exchange 12→line 20→exchange 13→line 23→exchange 16→line 24→exchange 15→incoming terminal 11.

Figure 5:
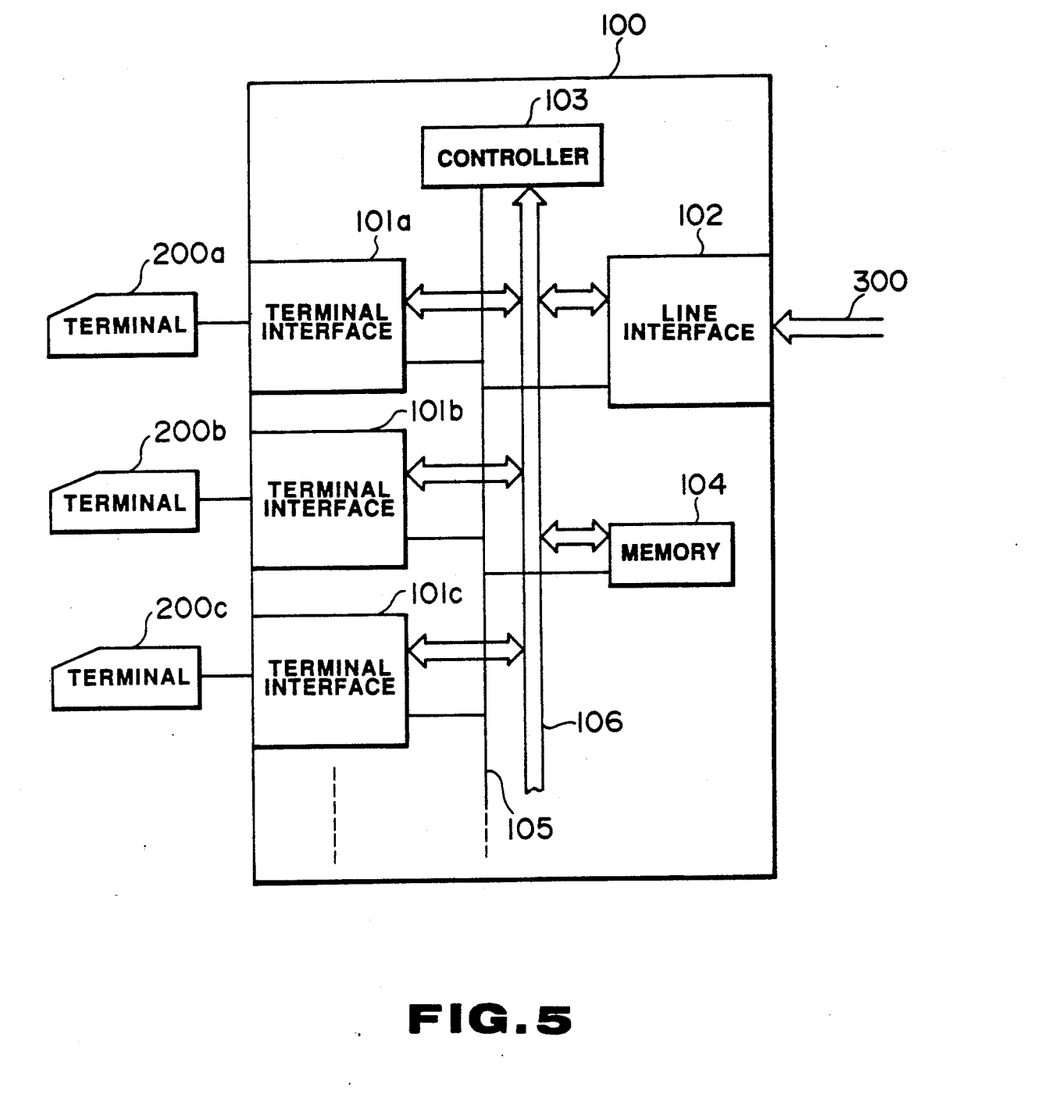
FIG. 5 is a block diagram of an example of an exchange used in the present invention.

The exchanges 12 to 16, which form a relay route for transmission of communication data, include connection type packet exchanges, connection type line exchanges, connection type asynchronous transfer mode exchanges and the like exchanges. The schematic arrangement of a connection type packet exchange as an example is shown by a block diagram in FIG. 5. In the drawing, a connection type packet exchange 100 includes terminal interfaces 101a to 101c connected to terminal apparatuses 200a to 200c respectively, a line interface 102 connected to a line 300, a controller 103 for controlling the entire exchange 100, and a memory 104 for storing therein various control data in the controller 103. The terminal interfaces 101a to 101c, line interface 102 and memory 104 are connected to the controller 103 by a control bus 105 and a data bus 106.

Figure 6:
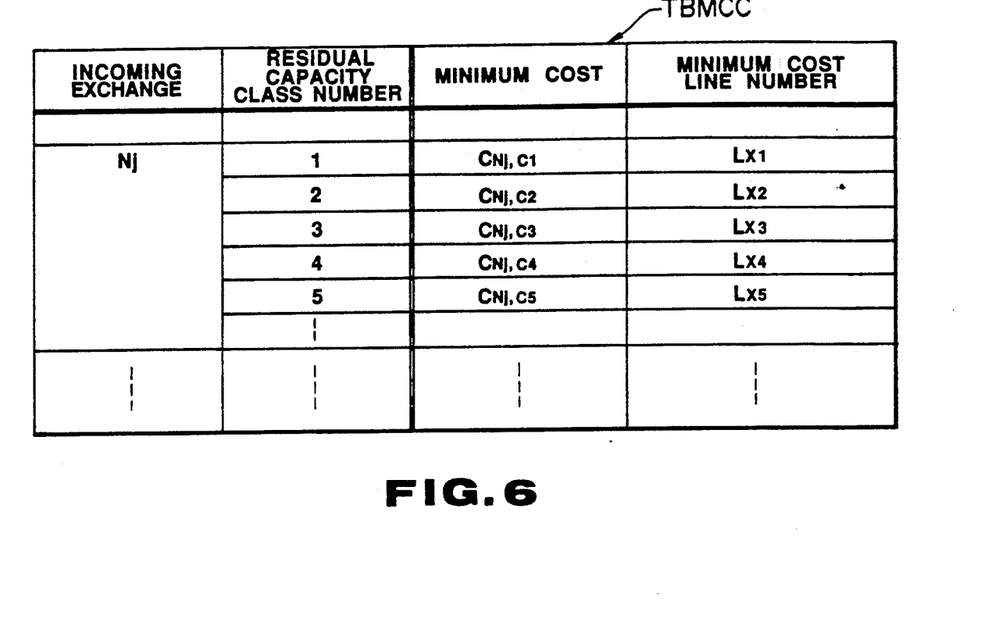
FIG. 6 shows the structure of a minimum cost table by residual line capacity classes.

Each of the exchanges 12 to 16 in this embodiment of FIG. 4 has such a minimum cost table TBMCC as shown in FIG. 6, in which residual line capacities are divided into a plurality of classes according to predetermined capacity units and line numbers $L_x$ corresponding to the minimum cost up to the incoming exchange (exchange 15) with respect to the different classes are stored. The system decides one of the routes from the outgoing terminal 10 to the incoming terminal 11 by referring to the table TBMCC. With the arrangement of FIG. 5, the minimum cost table TBMCC is provided in the memory 104. In FIG. 6, reference symbol Nj denotes the number of an incoming exchange, $[C_{Nj,Cm}]$ such as $[C_{Nj,C1}]$ or $[C_{Nj,C2}]$ denotes the minimum cost of lines in the tandem connection directed to the incoming exchange $N_j$ according to the residual line capacity class $C_m$, and $L_{xm}$ such as $L_{x1}$ or $L_{x2}$ denotes a minimum-cost line number for the residual line capacity class $C_m$.

Figure 7:
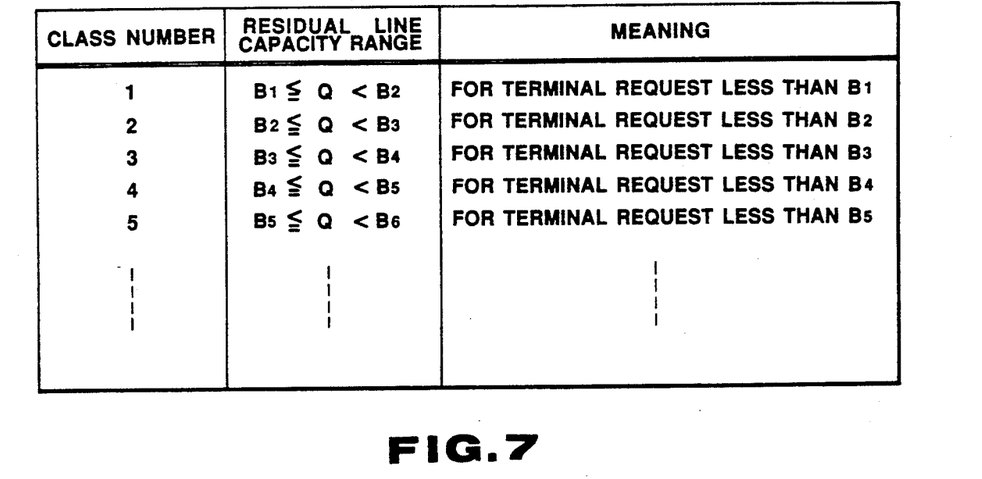
FIG. 7 shows organization criterions for the residual line capacity classes.

As shown in FIG. 7, the residual line capacity classes $C_m$ are expressed in terms of such line capacity ranges as $B_1 \leq Q < B_2$, $B_2 \leq Q < B_3$, $B_3 \leq Q < B_4$, ..., in which the line capacity Q is classified into ranges having a plurality of limits or stages corresponding to predetermined capacity units (such as $B_1$, $B_2$, ...). For example, class 1 corresponding to $C_m = 1$ indicates that tandem connection can be realized for the line request capacity q less than the capacity $B_1$.

Figure 8:
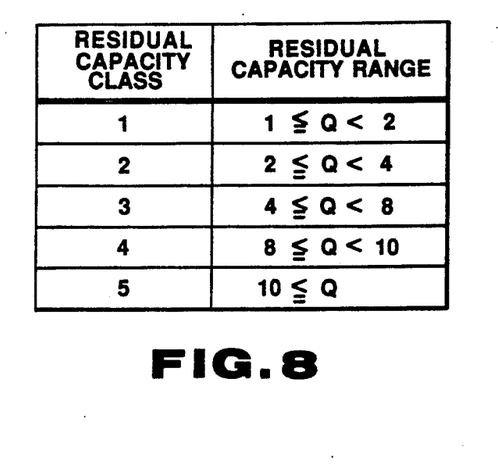
FIG. 8 shows a particular example of the organization criterions for the residual line capacity classes.

Assume now that the residual line capacity classes $C_m$ are divided as shown in FIG. 8, the lines 20 to 24 have loads, 15, 15, 5, 25 and 10 respectively as in the example of FIG. 1. Assume further that the request line capacity q of the outgoing terminal 10 is 2 and the lines 20 to 24 have residual capacities Q of 4, 5, 1, 4 and 6 respectively. With respect to the exchange 12, since the residual line capacity Q is "4", the residual line capacity is divided into classes 1 to 3 as shown by a minimum cost table TBMCC in FIG. 4. For class 1, the minimum cost is "15+15+5" and the minimum cost line number $L_{x1}$ is $L_1$ corresponding to the line number of the line 20 in the minimum cost table. Similarly, for class 2, the minimum cost is "15+25+10" and the minimum cost line number $L_{x2}$ is $L_1$ corresponding to the line number of the line 20; for class 3, the minimum cost is "15+25+10" and the minimum cost line number $L_{x3}$ is $L_1$ corresponding to the line number of the line 20.

With respect to the exchange 13, the minimum cost is "15+5" and the minimum cost line number $L_{x1}$ is $L_2$ corresponding to the line number of the line 21 for class 1; the minimum cost is "25+10" and the minimum cost line number $L_{x2}$ is $L_3$ corresponding to the line number of the line 23 for class 2; and the minimum cost is "25+10" and the minimum cost line number $L_{x3}$ is $L_3$ corresponding to the line number of the line 23 for class 3.

With respect to th exchange 16, the minimum cost is "10" and the minimum cost line number $L_x$ is $L_2$ corresponding to the line number of the line 24, for all classes 1 to 3.

With respect to the exchange 14, since the residual line capacity Q is 1, the minimum cost is "5" and the minimum cost line number $L_{x1}$ is $L_1$ corresponding to the line 22 only for class 1.

Figure 9:
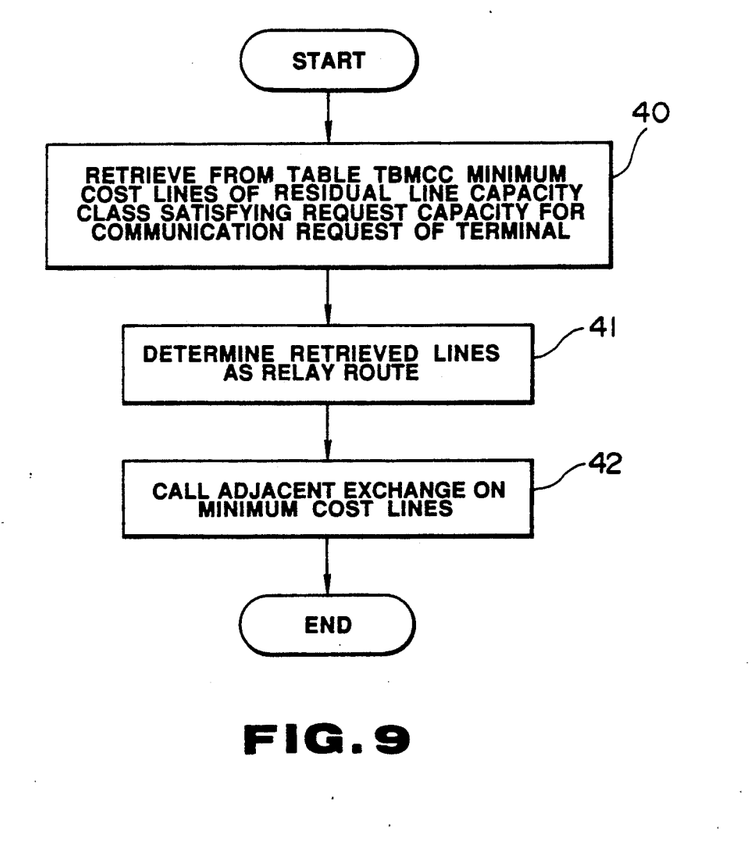
FIG. 9 is a flowchart showing a route decision procedure in accordance with the present invention.

Under such conditions, when the outgoing terminal 10 issues a calling request having a line request capacity q of 2, each of the exchanges 12 to 16 retrieves the associated minimum cost table TBMCC classified according to the residual line capacity classes and extract the minimum cost line numbers $L_x$ for the class satisfying the line request capacity q (step 40), as shown by a route decision procedure flowchart in FIG. 9. Then, the system decides the extracted minimum cost line number $L_x$ as a minimum cost route leading to the incoming terminal 11 (step 41) and sends the calling request to the adjacent exchange connected to the downstream end of the line of the decided minimum cost line number $L_x$ (step 42). The adjacent exchange, when receiving the calling request, decides a minimum cost route leading to the incoming terminal 11 in the same manner as for the first exchange.

More in detail, the exchange 12, since the line request capacity q is 2, selects the line number $L_1$ (line 20) for class 2 satisfying the condition q=2. Next, the exchange 13 selects the line number $L_3$ (line 23) for class 2 satisfying the condition q=2. The exchange 16 then selects the line number $L_2$ (line 24) for class 2. As a result, the outgoing terminal 10 is connected with the incoming terminal 11 by the route of exchange 12→line 20 →exchange 13→line 23→exchange 16→line 24→exchange 15.

As a result, any call loss will not take place except for the case where no route satisfying the request line capacity condition is available.

In order to realize the route decision method mentioned above, each of the exchanges must confirm the associated residual line capacity and prepare such a minimum cost table TMBCC classified according to the residual line capacity class as shown in FIG. 6.

Explanation will be made as to how to prepare the table TBMCC.

Figure 10:
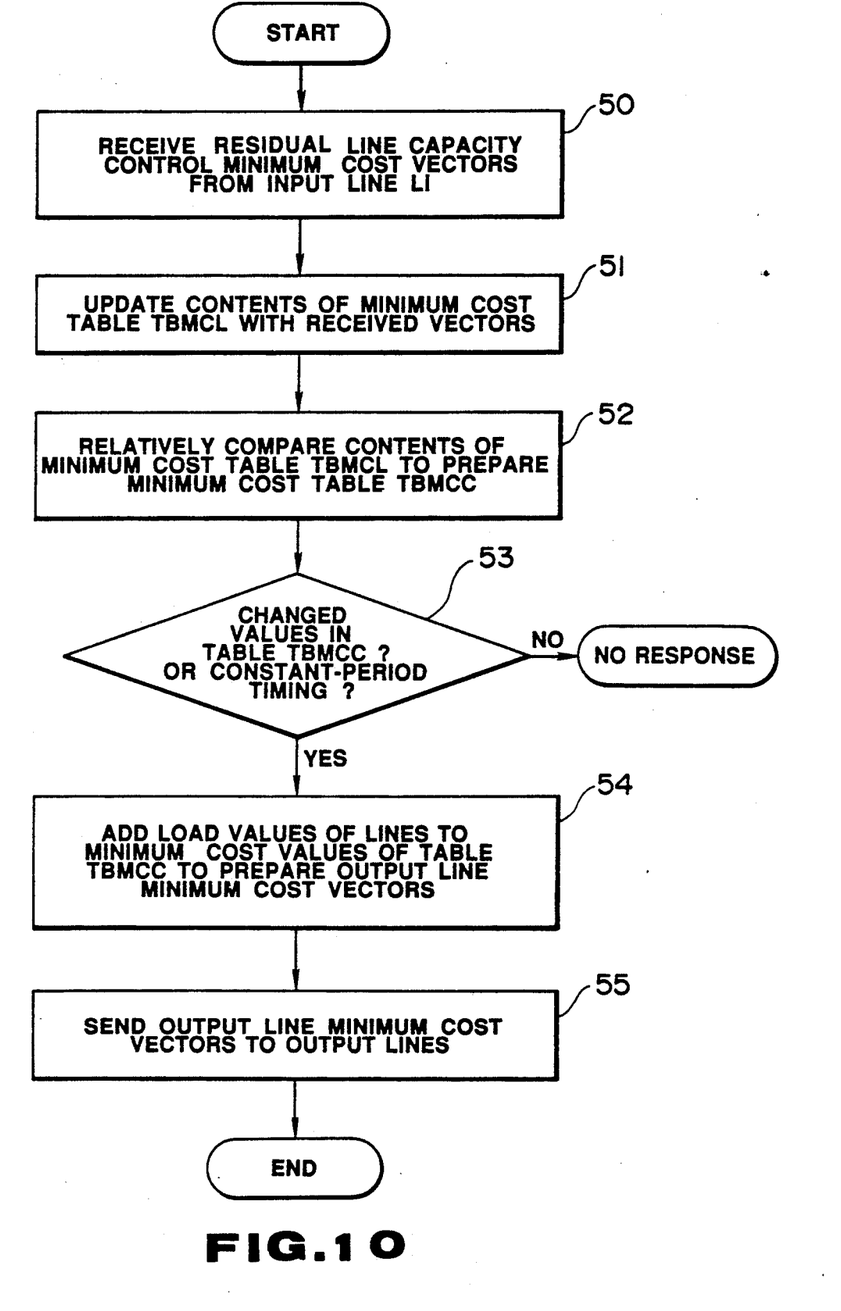
FIG. 10 is a flowchart showing a procedure of preparing the minimum cost table by residual line capacity classes.
Figure 11:
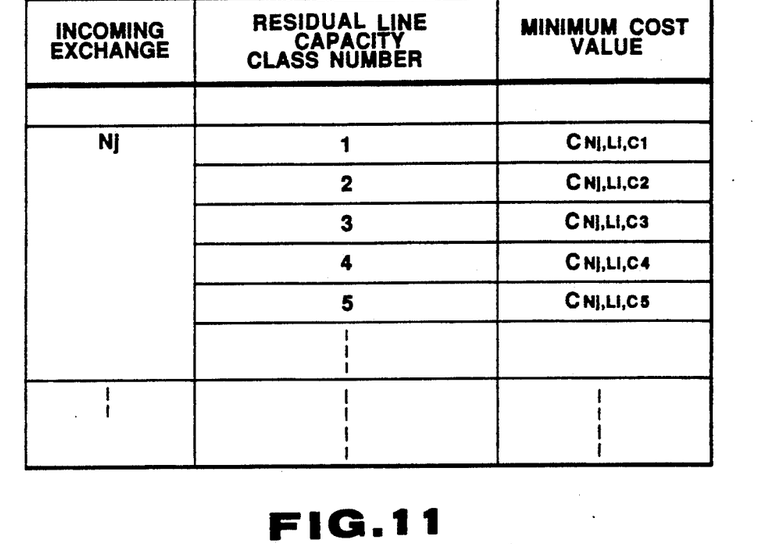
FIG. 11 shows the contents of minimum cost vectors for input line residual capacity control.
Figure 12:
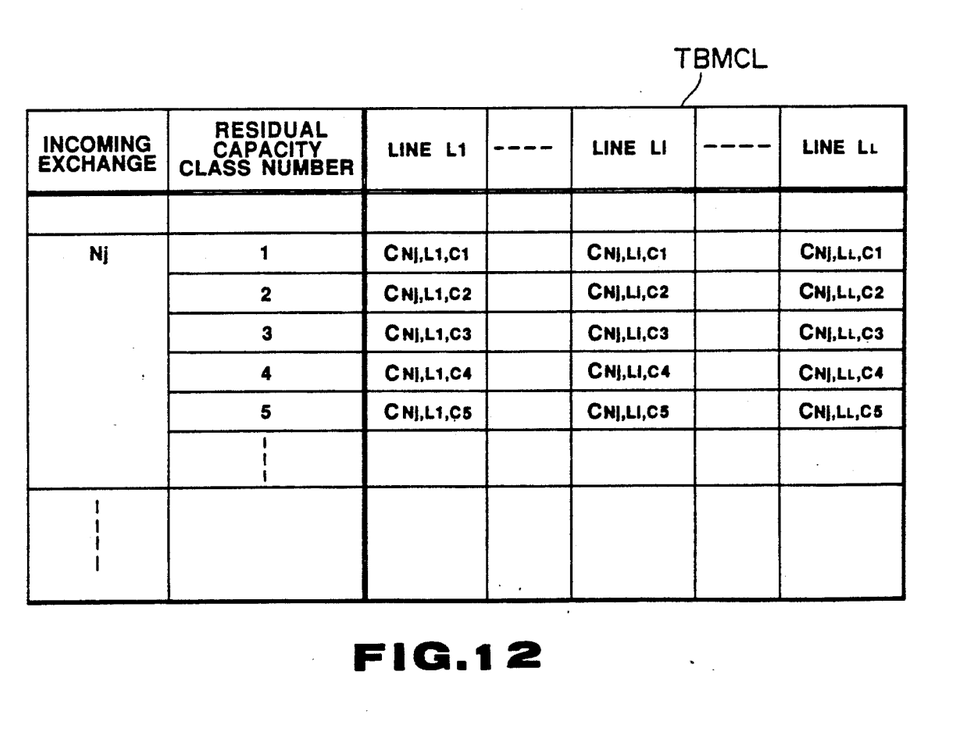
FIG. 12 shows the structure and contents of a minimum cost table by lines.

Shown in FIG. 10 is a flowchart explaining a procedure for preparing the table TBMCC. This procedure is executed according to two conditions, i.e., whether or not the residual capacity or load of the each line has been changed or whether to be a constant period timing. More in detail, when one exchange first relays and sends a call from the outgoing terminal to another exchange provided at its downstream side, this causes the residual line capacity at the downstream exchange to be changed. If the line capacity change is to be shifted to another residual line capacity class, then the downstream exchange transmits to the input line (line number $L_i$) of the upstream exchange such minimum cost values $C_{Nj,Li,Cm}$ classified according to the residual capacity classes of the lines leading to the incoming exchange $N_j$ as shown in FIG. 11, as minimum cost vectors for input-line residual capacity control. The upstream exchange, when receiving these vectors (step 50), updates to the then received minimum cost values $C_{Nj,Li,Cm}$ the minimum cost values of input line number $L_i$ in a by-lines minimum cost table TBMCL (listing the minimum costs for all the lines leading to the incoming exchange $N_j$ according to the residual line capacity class, as shown in FIG. 12 (step 51). Then the exchange compares the minimum cost values in the row direction in the table TBMCL, extracts the line number $L_x$ enabling the realization of minimum cost relay with respect to the incoming exchange $N_j$ as well as the corresponding minimum cost, and prepares such a minimum cost table TBMCC classified according to the residual line capacity class as shown in FIG. 6 (step 52).

Figure 13:
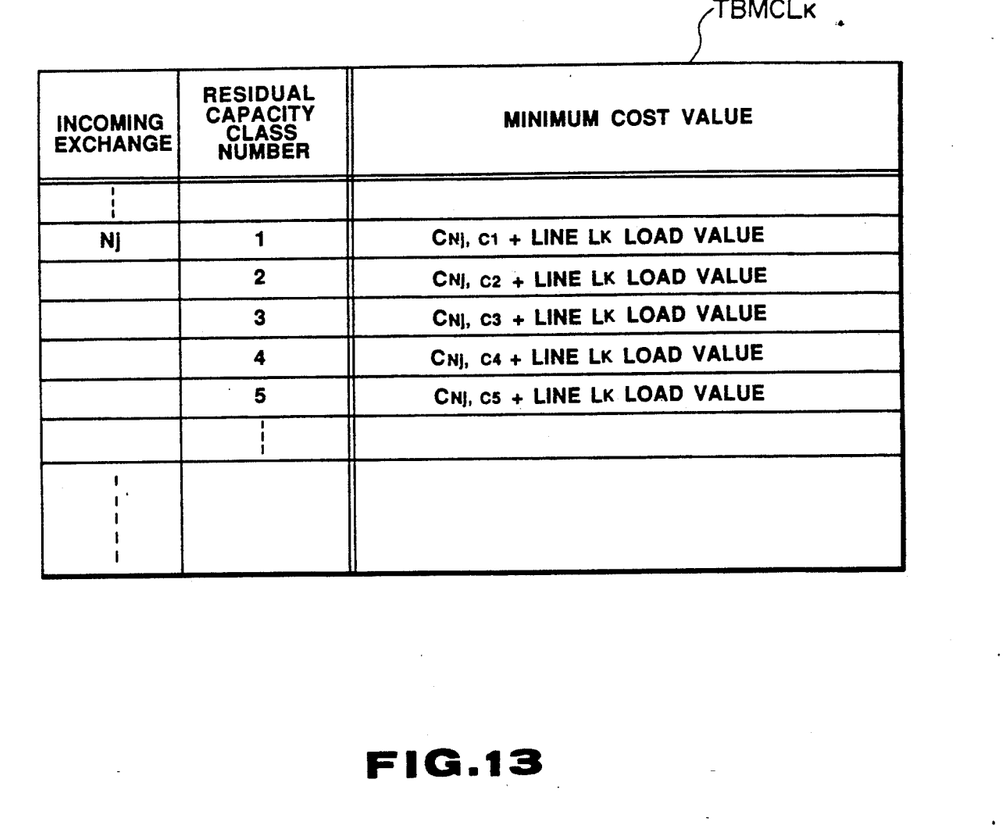
FIG. 13 shows the structure and contents of a minimum cost vector for output line residual capacity control.

Thereafter, when the minimum cost table TBMCC classified according to the residual line capacity class is changed, the exchange adds the current load values of all the line numbers $L_k$ except for the input line number $L_i$ to the minimum cost values of the line numbers $L_k$ respectively, and prepares such a table $\hat{T}BMCL_k$ for output line residual capacity minimum cost vector as shown in FIG. 13 (steps 53 and 54). When the contents of the table TBMCC have not been changed but data exchange timing is made at a regular period, the step 54 is executed. In the case of the regular-period data exchange timing, the exchange adds the current load values of all the line numbers including the input line number $L_i$ to the minimum cost values of the line numbers $L_k$.

Then, the exchange transmits the contents of the table $TBMCL_k$ of FIG. 13 to the associated output line numbers $L_k$ (step 55). As a result, the system can discriminate the minimum cost values classified according to the residual line capacity class at the mutually adjacent exchanges, and can dynamically judge on the basis of the discrimination and select one of routes up to the incoming terminal providing the minimum cost while following load variations in the exchanges.

The residual line capacity class organization has been effected on a two channel basis in the example of FIG. 8. This is for the purpose of avoiding such a disadvantage that, when class organization on a one channel basis is employed, each increase or decrease in the number of operating lines by one will cause the load fluctuations and correspondingly the frequent transfer of data telling the load fluctuations, which results in that the loads of the exchanges are increased or the line operating efficiency is reduced. In the case where the processing capacity of the each exchange is sufficiently large or connection lines have sufficient capacities, the class organization may also be effected on a one channel basis as necessary.

What is claimed is:

1. An exchange route decision system for use in a network, said network comprising a plurality of terminals and exchanges, said plurality of terminals using a plurality of transmission rates, transmitting real-time data, and including an outgoing terminal and an incoming terminal, said plurality of exchanges connected by lines having varying capacities and varying loads to establish a plurality of communication routes and including an outgoing exchange connected to said outgoing terminal and an incoming exchange connected to said incoming exchange, and said exchange route decision system for determining one of said plurality of communication routes between said outgoing exchange and said incoming exchange, comprising:

memory means for dividing residual capacities of said lines into a plurality of residual line capacity classes and for storing minimum cost values corresponding to a plurality of minimum cost routes from said outgoing exchange to said incoming exchange, said plurality of minimum cost routes determined in accordance with said plurality of residual line capacity classes;

retrieval means for retrieving a minimum cost value in accordance with one of said plurality of residual line capacity classes in response to a line capacity requested by said outgoing terminal; and decision means for selecting one of said plurality of communication routes in accordance with said retrieved minimum cost value.

2. An exchange route decision system as set forth in claim 1, wherein said lines are designated by respective line numbers and said memory means stores the line numbers corresponding to the lines comprising said plurality of minimum cost routes.

3. An exchange route decision system as set forth in claim 1, wherein said retrieval means are responsive to a line capacity request by said incoming exchange.

4. An exchange route decision system as set forth in claim 1, wherein each minimum cost value is an estimate expressed in terms of a sum of the line loads for the lines comprising each corresponding minimum cost route.

5. An exchange route decision system as set forth in claim 1, wherein each minimum cost value is an estimate defined by an equation;

$$C_j = \sum_{Li} (\alpha + \beta D_{Li}).$$

wherein $L_i$ denote lines comprising each corresponding minimum cost route, $D_{Li}$ denote distances between said lines, $\alpha$ denotes a processing load cost for a respective exchange and $\beta$ denotes a cost coefficient related to line distance.

6. An exchange route decision system for use in a network, said network comprising a plurality of terminals and exchanges, said plurality of terminals using a plurality of transmission rates, transmitting real-time data, and including an outgoing terminal and an incoming terminal, said plurality of exchanges connected by lines having varying capacities and varying loads to establish a plurality of communication routes and including an outgoing exchange connected to said outgoing terminal and an incoming exchange connected to said incoming exchange, and said exchange route decision system for determining one of said plurality of communication routes between said outgoing exchange and said incoming exchange, comprising:

memory means for dividing residual capacities of said lines into a plurality of residual line capacity classes and for storing minimum cost values corresponding to a plurality of minimum cost routes from said outgoing exchange to said incoming exchange, said plurality of minimum cost routes determined in accordance with said plurality of residual line capacity classes;

retrieval means for retrieving a minimum cost value corresponding to one of said plurality of residual line capacity classes in response to a line capacity requested by said outgoing terminal;

decision means for selecting one of said plurality of communication routes in accordance with the retrieved minimum cost value; and communication means between adjacent exchanges for transmitting and receiving residual-line-capacity control minimum cost vectors.

7. An exchange route decision system as set forth in claim 6, wherein said communication means transmits and receives said residual-line-capacity control minimum cost vectors when said residual line capacity classes or said minimum cost values are changed.

8. An exchange route decision system as set forth in claim 6, wherein said communication means cyclically tranmits said residual-line-capacity control minimum cost vectors at a predetermined period.

9. An exchange route decision system as set forth in claim 6, said communication means further comprising:

vector generating means for generating residual-line-capacity control minimum cost vectors to be transmitted to an adjacent exchange in response to residual-line-capacity control minimum cost vectors received from another adjacent exchange.

10. An exchange route decision system as set forth in claim 9, said vector generating means further comprising:

means for preparing a minimum cost table containing minimum cost values for lines comprising said plurality of communication routes, said minimum cost values being determined in accordance with said incoming exchange and said residual line capacity classes;

means for rewriting in said minimum cost table in response to received residual-line-capacity control minimum cost vectors; and, means for retrieving the minimum cost values contained in said minimum cost table and for adding line loads for the lines comprising each of said plurality of communication routes up to an adjacent exchange to said retrieved minimum cost line values, thereby generating said residual-line-capacity control minimum cost vectors.

11. A route decision method in which tandem connection between an outgoing terminal and an incoming terminal is attained through a network, comprising a plurality of exchanges connected by lines having varying capacities and varying loads to form a plurality of communication routes, by selecting at each one of said plurality of exchanges, a minimum cost route from said plurality of communication routes between said outgoing terminal and said incoming terminal, comprising the steps at each exchange of:

dividing line capacity not currently being used into a plurality of line capacity classes based on predetermined capacity units for each one of the lines comprising said plurality of communication routes;

determining minimum cost values for corresponding to a plurality of minimum cost routes said plurality of minimum cost routes determined in accordance with said plurality of line capacity classes;

selecting one of said plurality of communication routes based on said minimum cost values in response to one of said plurality of line capacity classes requested by said outgoing terminal; and performing tandem connection between said outgoing terminal and said incoming terminal through said selected communication route.

12. An exchange route decision method as set forth in claim 11, wherein each minimum cost value is an estimate expressed in terms of a sum of line loads for the lines comprising each corresponding minimum cost.

13. An exchange route decision method as set forth in claim 11, wherein each minimum cost value is an estimate defined as an equation $$C_j = \sum_{L_i} (\alpha + \beta D_{Li}),$$

where $L_i$ denote lines of each route, $D_{Li}$ denote distances between said lines, $\alpha$ denotes a processing load cost of a relay exchange and $\beta$ denotes a cost coefficient relation to line distance.

14. An exchange route decision method as set forth in claim 11, further comprising the step of modifying said minimum cost values and sequentially transmitting said minimum cost values to an adjacent exchange when one of said plurality of residual line capacity classes is changed.

15. An exchange route decision method as set forth in claim 11, further comprising the step of modifying said minimum values and sequentially transmitting said minimum cost values to an adjacent exchange when a line load is changed.

16. An exchange route decision method as set forth in claim 11, further comprising the step of cyclically modifying said minimum cost values and sequentially transmitting said minimum cost values to an adjacent exchange at a predetermined period.

* * * * *